US012574842B2

(12) United States Patent
Luan et al.

(10) Patent No.: US 12,574,842 B2
(45) Date of Patent: Mar. 10, 2026

(54) METHODS AND APPARATUSES FOR MARITIME COMMUNICATION

(71) Applicant: Telefonaktiebolaget LM Ericsson (PUBL), Stockholm (SE)

(72) Inventors: Shunqi Luan, Shanghai (CN); Tianyi Li, Shanghai (CN); Yanping Dang, Beijing (CN)

(73) Assignee: Telefonaktiebolaget LM Ericsson (PUBL), Stockholm (SE)

( * ) Notice: Subject to any disclaimer, the term of this patent is extended or adjusted under 35 U.S.C. 154(b) by 695 days.

(21) Appl. No.: 17/997,132

(22) PCT Filed: Apr. 27, 2020

(86) PCT No.: PCT/CN2020/087293
§ 371 (c)(1),
(2) Date: Oct. 26, 2022

(87) PCT Pub. No.: WO2021/217357
PCT Pub. Date: Nov. 4, 2021

(65) Prior Publication Data
US 2023/0199644 A1 Jun. 22, 2023

(51) Int. Cl.
*H04W 24/08* (2009.01)
*H04B 7/15* (2006.01)
(Continued)

(52) U.S. Cl.
CPC .......... *H04W 52/0206* (2013.01); *H04B 7/15* (2013.01)

(58) Field of Classification Search
CPC .... H04W 52/0206; H04W 24/02; H04B 7/15; Y02D 30/70
See application file for complete search history.

(56) References Cited

U.S. PATENT DOCUMENTS 9,622,133 B1 * 4/2017 Guvenc ................. H04W 36/20
2009/0023458 A1 1/2009 Mountney
(Continued)

FOREIGN PATENT DOCUMENTS

CN 101621782 A 1/2010
CN 102215533 A 10/2011
(Continued)

OTHER PUBLICATIONS

PCT Notification of Transmittal of the International Search Report and the Written Opinion of the International Searching Authority, or the Declaration issued for International application No. PCT/CN2020/087293—Jan. 29, 2021.
(Continued)

*Primary Examiner* — Faruk Hamza
*Assistant Examiner* — Aixa A Guadalupe Cruz
(74) *Attorney, Agent, or Firm* — Baker Botts L.L.P.

(57) ABSTRACT

Methods and apparatuses are disclosed for maritime communication. According to an embodiment, a network comprises a first server and a first base station at a first maritime vessel, and one or more second servers and one or more second base stations at one or more respective second maritime vessels. In response to a trigger event indicating that interference between at least two base stations of the first base station and the one or more second base stations is serious, the first server obtains a contribution value of the first base station to the network determined by the second server. The first server determines whether the first base station needs power reduction or power off based at least on the obtained contribution value. When determining that the first base station needs power reduction or power off, the first server sends an instruction for power reduction or power off to the first base station.

20 Claims, 8 Drawing Sheets

(51) Int. Cl.

| | | |
|---|---|---|
| *H04B 7/185* | (2006.01) | |
| *H04W 36/20* | (2009.01) | |
| *H04W 36/30* | (2009.01) | |
| *H04W 52/02* | (2009.01) | |
| *H04W 74/08* | (2024.01) | |

(56) References Cited

U.S. PATENT DOCUMENTS

| | | | |
|---|---|---|---|
| 2014/0018119 A1 | 1/2014 | Xu et al. | |
| 2015/0257167 A1 | 9/2015 | Chen et al. | |
| 2016/0142880 A1* | 5/2016 | Talluri | H04W 64/006 |
| | | | 455/456.1 |
| 2018/0167875 A1 | 6/2018 | Lee et al. | |

FOREIGN PATENT DOCUMENTS

| | | | |
|---|---|---|---|
| CN | 110831043 A | 2/2020 | |
| WO | WO-2008103840 A1 * | 8/2008 | H04W 84/005 |

OTHER PUBLICATIONS

Extended European Search Report issued for Application No. / Patent No. 20933822.7-1216 / 4118759 PCT/CN2020087293—Mar. 31, 2023.

Ming-Tuo Zhou et al., "Interference Range Analysis and Scheduling Among Three-hop Neighborhood in Maritime WiMAX Mesh Networks" 2010.

Ailing Xiao et al., "A Voyage-Based Cooperative Resource Allocation Scheme in Maritime Broadband Access Network" 2017.

* cited by examiner

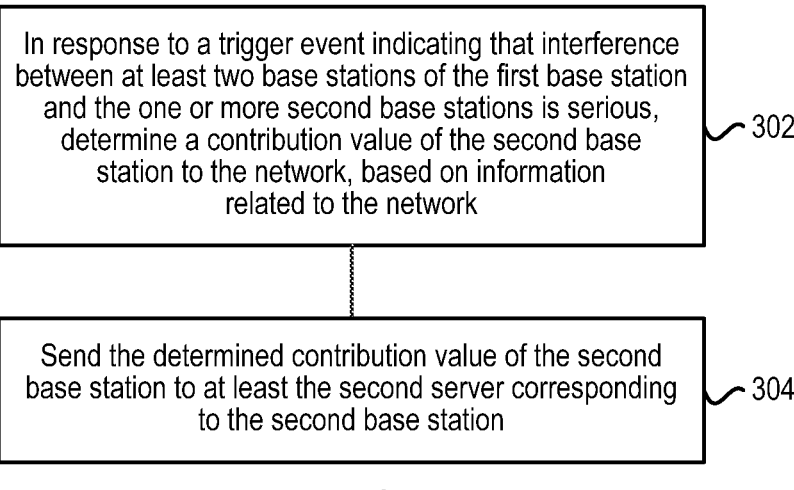

In response to a trigger event indicating that interference between at least two base stations of the first base station and the one or more second base stations is serious, determine a contribution value of the second base station to the network, based on information related to the network ⟋302

Send the determined contribution value of the second base station to at least the second server corresponding to the second base station ⟋304

FIG. 3

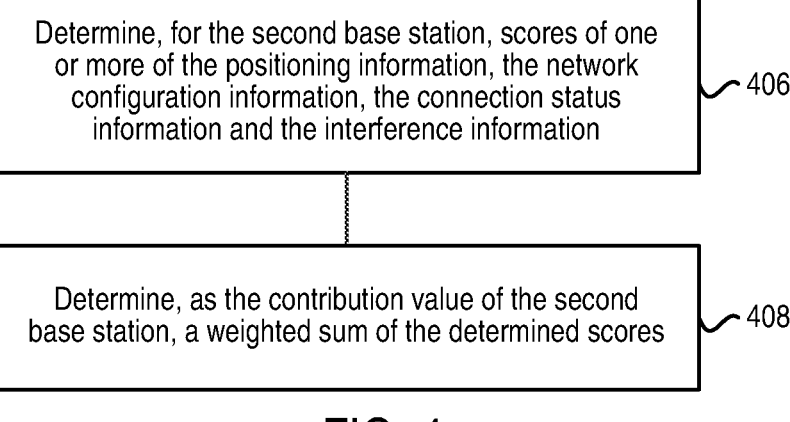

Determine, for the second base station, scores of one or more of the positioning information, the network configuration information, the connection status information and the interference information ⟋406

Determine, as the contribution value of the second base station, a weighted sum of the determined scores ⟋408

FIG. 4

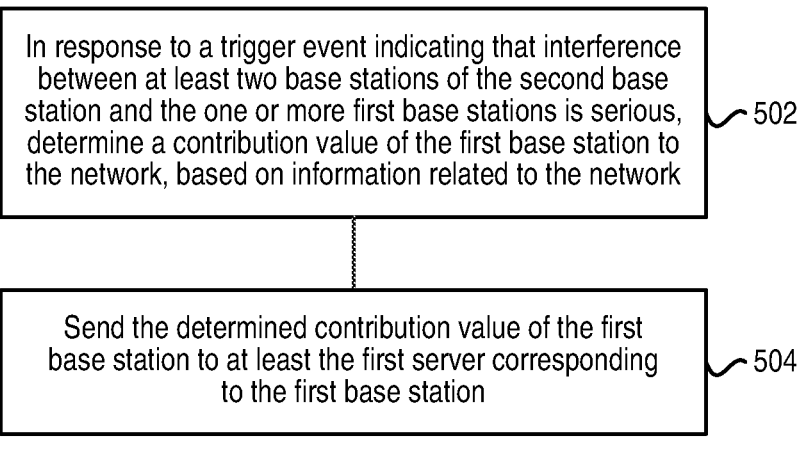

In response to a trigger event indicating that interference between at least two base stations of the second base station and the one or more first base stations is serious, determine a contribution value of the first base station to the network, based on information related to the network    ⌇502

Send the determined contribution value of the first base station to at least the first server corresponding to the first base station    ⌇504

FIG. 5

In response to a trigger event indicating that interference between at least two base stations of the first base station and the one or more second base stations is serious, obtain a contribution value of the first base station to the network determined by the second server    ⌇602

Determine whether the first base station needs power reduction or power off based at least on the obtained contribution value    ⌇604

When determining that the first base station needs power reduction or power off, send an instruction for power reduction or power off to the first base station    ⌇606

FIG. 6

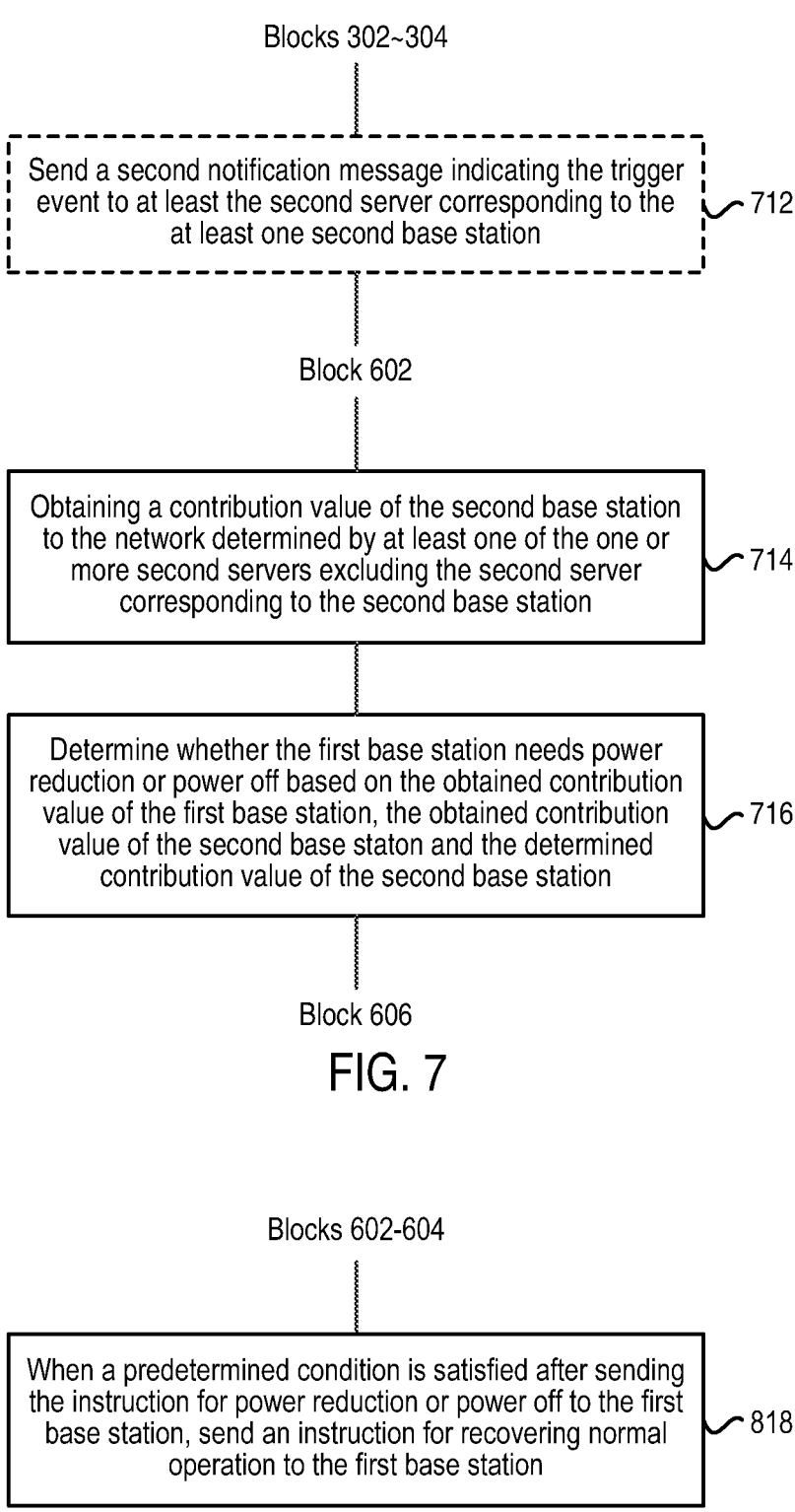

Blocks 302~304

Send a second notification message indicating the trigger event to at least the second server corresponding to the at least one second base station — 712

Block 602

Obtaining a contribution value of the second base station to the network determined by at least one of the one or more second servers excluding the second server corresponding to the second base station — 714

Determine whether the first base station needs power reduction or power off based on the obtained contribution value of the first base station, the obtained contribution value of the second base staton and the determined contribution value of the second base station — 716

Block 606

FIG. 7

Blocks 602-604

When a predetermined condition is satisfied after sending the instruction for power reduction or power off to the first base station, send an instruction for recovering normal operation to the first base station — 818

FIG. 8

METHODS AND APPARATUSES FOR MARITIME COMMUNICATION

PRIORITY

This nonprovisional application is a U.S. National Stage Filing under 35 U.S.C. § 371 of International Patent Application Serial No. PCT/CN2020/087293 filed Apr. 27, 2020 and entitled "Methods and Apparatuses for Maritime Communication" which is hereby incorporated by reference in its entirety.

TECHNICAL FIELD

Embodiments of the disclosure generally relate to communication, and, more particularly, to methods and apparatuses for maritime communication.

BACKGROUND

This section introduces aspects that may facilitate better understanding of the present disclosure. Accordingly, the statements of this section are to be read in this light and are not to be understood as admissions about what is in the prior art or what is not in the prior art.

Typically, a maritime vessel communicates with remote communication devices via terrestrial networks, or satellite networks when the maritime vessel is out of reach of the terrestrial networks or in other special conditions. For instance, when out of range of the terrestrial networks, machine-to-machine (M2M) devices on a maritime vessel may connect to a base station on the maritime vessel, which in turn is connected via a satellite network to a core network somewhere on land. The connection decision is based on the vessel's proximity to the terrestrial networks.

In the above typical solution, the maritime vessels, however, do not take advantage of other maritime vessels in close proximity to create opportunities for more cost effective and efficient communication therebetween and, ultimately, to the terrestrial networks. Also, it is not uncommon for a maritime vessel to lose satellite connectivity because the heading of the maritime vessel is such that a line of sight to the satellite from the satellite communication equipment onboard the maritime vessel becomes blocked by structures onboard the maritime vessel. Besides, limited by the technique, the satellite network cannot provide high speed service, like file transfer or video. Additionally, the typical solution does not take into account national jurisdictions with respect to the location of the maritime vessels, and associated potential ad hoc networks, to send and receive information both legally and efficiently.

Despite continued efforts to improve communication and reduce communication costs for a maritime vessel, a system is needed to mitigate the substantial hindrances for reliable radio communication from the maritime vessel to external networks such as the terrestrial networks.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for maritime communication. In particular, one of the problems to be solved by the disclosure is to reduce the interference of the maritime communication network.

According to a first aspect of the disclosure, there is provided a method performed by a first server in a network. The network may comprise the first server and a first base station at a first maritime vessel, and one or more second servers and one or more second base stations at one or more respective second maritime vessels. The method may comprise, in response to a trigger event indicating that interference between at least two base stations of the first base station and the one or more second base stations is serious, obtaining a contribution value of the first base station to the network determined by the second server. The method may further comprise determining whether the first base station needs power reduction or power off based at least on the obtained contribution value. The method may further comprise, when determining that the first base station needs power reduction or power off, sending an instruction for power reduction or power off to the first base station.

In this way, the interference of the network can be reduced by using an interference self-controlling mechanism.

In an embodiment of the disclosure, the at least two base stations may comprise the first base station and at least one second base station.

In an embodiment of the disclosure, the at least two base stations may comprise at least two second base stations.

In an embodiment of the disclosure, the method may further comprise determining a contribution value of the second base station to the network, based on information related to the network. The method may further comprise sending the determined contribution value of the second base station to at least the second server corresponding to the second base station.

In an embodiment of the disclosure, the determined contribution value of the second base station may be sent to the one or more second servers.

In an embodiment of the disclosure, the determining whether the first base station needs power reduction or power off may be based further on the determined contribution value of the second base station.

In an embodiment of the disclosure, the method may further comprise obtaining a contribution value of the second base station to the network determined by at least one of the one or more second servers excluding the second server corresponding to the second base station. The determining whether the first base station needs power reduction or power off may be based further on the obtained contribution value of the second base station.

In an embodiment of the disclosure, the trigger event may be that the first server receives, from a second relay terminal device served by the first base station, a first notification message indicating that interference between the first base station and the at least one second base station is serious.

In an embodiment of the disclosure, the method may further comprise sending a second notification message indicating the trigger event to at least the second server corresponding to the at least one second base station.

In an embodiment of the disclosure, for the second relay terminal device, a received signal quality from the at least one second base station which is not on the same maritime vessel as the second relay terminal device may be greater than a first predetermined threshold.

In an embodiment of the disclosure, for the second relay terminal device, a received signal quality from the at least one second base station which is not on the same maritime vessel as the second relay terminal device may be greater than a received signal quality from the first base station by a second predetermined threshold or more.

In an embodiment of the disclosure, the method may further comprise, when a predetermined condition is satisfied after sending the instruction for power reduction or power off to the first base station, sending an instruction for recovering normal operation to the first base station.

In an embodiment of the disclosure, the predetermined condition may be one of: at least one of the one or more second base stations being disconnected from the network; at least one of the one or more second base stations being disconnected from the network for a first predetermined time period; and a second predetermined time period having elapsed.

In an embodiment of the disclosure, the determining whether the first base station needs power reduction or power off may be based on comparison between the contribution value of the first base station and a predetermined contribution threshold.

In an embodiment of the disclosure, the determining whether the first base station needs power reduction or power off may be based on comparison between the contribution value of the first base station and the contribution value of the second base station.

In an embodiment of the disclosure, the first server may determine that the first base station does not need power reduction or power off, when multiple base stations within a predetermined geographical area need power reduction or power off according to the comparison, but the first base station in the multiple base stations has the highest contribution to the network.

In an embodiment of the disclosure, the first server may determine that the first base station does not need power reduction or power off when the first base station is the only one base station among the first base station and the one or more second base stations that is connected directly with a backhaul node on land.

In an embodiment of the disclosure, the information related to the network may comprise one or more of: positioning information of the first base station and the second base station; network configuration information of the first base station and the second base station; connection status information indicating connection status between the first base station and the second base station; and interference information indicating interference between the first base station and the second base station.

In an embodiment of the disclosure, determining a contribution value of the second base station to the network may comprise determining, for the second base station, scores of one or more of the positioning information, the network configuration information, the connection status information and the interference information. Determining a contribution value of the second base station to the network may further comprise determining, as the contribution value of the second base station, a weighted sum of the determined scores.

In an embodiment of the disclosure, the positioning information may indicate relative moving direction between the first and the second base station. The score of the positioning information indicating that the first and the second base station move away from each other may be greater than the score of the positioning information indicating that the first and the second base station move towards each other.

In an embodiment of the disclosure, the network configuration information may indicate physical cell identities (PCIs) of the first and the second base station. The score of the network configuration information indicating that the PCIs of the first and the second base station belong to different PCI groups may be greater than the score of the network configuration information indicating that the PCIs of the first and the second base station belong to the same PCI group.

In an embodiment of the disclosure, the connection status information may indicate link relationship between the first and the second base station. The score of the connection status information indicating that the second base station acts as a backhaul node of the first base station may be greater than the score of the connection status information indicating that the first base station acts as a backhaul node of the second base station.

In an embodiment of the disclosure, the stronger the interference between the first and the second base station is, the smaller the score of the interference information may be.

According to a second aspect of the disclosure, there is provided a method performed by a second server in a network. The network may comprise the second server and a second base station at a second maritime vessel, and one or more first servers and one or more first base stations at one or more respective first maritime vessels. The method may comprise, in response to a trigger event indicating that interference between at least two base stations of the second base station and the one or more first base stations is serious, determining a contribution value of the first base station to the network, based on information related to the network. The method may further comprise sending the determined contribution value of the first base station to at least the first server corresponding to the first base station.

In an embodiment of the disclosure, the determined contribution value of the first base station may be sent to the one or more first servers.

According to a third aspect of the disclosure, there is provided a first server in a network. The network may comprise the first server and a first base station at a first maritime vessel, and one or more second servers and one or more second base stations at one or more respective second maritime vessels. The first server may comprise at least one processor and at least one memory. The at least one memory may contain instructions executable by the at least one processor, whereby the first server may be operative to, in response to a trigger event indicating that interference between at least two base stations of the first base station and the one or more second base stations is serious, obtain a contribution value of the first base station to the network determined by the second server. The first server may be further operative to determine whether the first base station needs power reduction or power off based at least on the obtained contribution value. The first server may be further operative to, when determining that the first base station needs power reduction or power off, send an instruction for power reduction or power off to the first base station.

In an embodiment of the disclosure, the first server may be operative to perform the method according to the above first aspect.

According to a fourth aspect of the disclosure, there is provided a second server in a network. The network may comprise the second server and a second base station at a second maritime vessel, and one or more first servers and one or more first base stations at one or more respective first maritime vessels. The second server may comprise at least one processor and at least one memory. The at least one memory may contain instructions executable by the at least one processor, whereby the second server may be operative to, in response to a trigger event indicating that interference between at least two base stations of the second base station and the one or more first base stations is serious, determine a contribution value of the first base station to the network, based on information related to the network. The second server may be further operative to send the determined contribution value of the first base station to at least the first server corresponding to the first base station.

In an embodiment of the disclosure, the second server may be operative to perform the method according to the above second aspect.

According to a fifth aspect of the disclosure, there is provided a computer program product. The computer program product may comprise instructions which when executed by at least one processor, cause the at least one processor to perform the method according to any of the above first and second aspects.

According to a sixth aspect of the disclosure, there is provided a computer readable storage medium. The computer readable storage medium may comprise instructions which when executed by at least one processor, cause the at least one processor to perform the method according to any of the above first and second aspects.

According to a seventh aspect of the disclosure, there is provided a first server in a network. The network may comprise the first server and a first base station at a first maritime vessel, and one or more second servers and one or more second base stations at one or more respective second maritime vessels. The first server may comprise an obtaining module for, in response to a trigger event indicating that interference between at least two base stations of the first base station and the one or more second base stations is serious, obtaining a contribution value of the first base station to the network determined by the second server. The first server may further comprise a determination module for determining whether the first base station needs power reduction or power off based at least on the obtained contribution value. The first server may further comprise a sending module for, when determining that the first base station needs power reduction or power off, sending an instruction for power reduction or power off to the first base station.

According to an eighth aspect of the disclosure, there is provided a second server in a network. The network may comprise the second server and a second base station at a second maritime vessel, and one or more first servers and one or more first base stations at one or more respective first maritime vessels. The second server may comprise a determination module for, in response to a trigger event indicating that interference between at least two base stations of the second base station and the one or more first base stations is serious, determining a contribution value of the first base station to the network, based on information related to the network. The second server may further comprise a sending module for sending the determined contribution value of the first base station to at least the first server corresponding to the first base station.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 3 is a flowchart illustrating a method performed by a first server according to an embodiment of the disclosure;

FIG. 4 is a flowchart for explaining the method of FIG. 3;

FIG. 5 is a flowchart illustrating a method performed by a second server according to an embodiment of the disclosure;

FIG. 6 is a flowchart illustrating a method performed by a first server according to an embodiment of the disclosure;

FIG. 7 is a flowchart illustrating a method performed by a first server according to an embodiment of the disclosure;

FIG. 8 is a flowchart illustrating a method performed by a first server according to an embodiment of the disclosure;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

In the existing commercial 3rd generation partnership project (3GPP) networks, the locations of base stations and the network topology are typically fixed in terrestrial long term evolution (LTE)/new radio (NR) networks. All cells are well designed to avoid intra-frequency interference by neighboring cells' cell-specific reference signal (CRS) or channel state information reference signal (CSI-RS) from physical cell identity (PCI) collision.

While in a maritime system, distances between ships' base stations (BSs) vary with the sailing routes. So, the maritime system should maintain a relatively unstable and more complicated communication mechanism than a terrestrial one. It includes stability, reachability, recoverability and self-organization. Due to ships in a certain area being too crowded, it will cause serious interference and downgrade of end user throughput.

The present disclosure proposes an improved solution for maritime communication. Hereinafter, the solution will be described in detail with reference to FIGS. 1-13.

Figure 1:
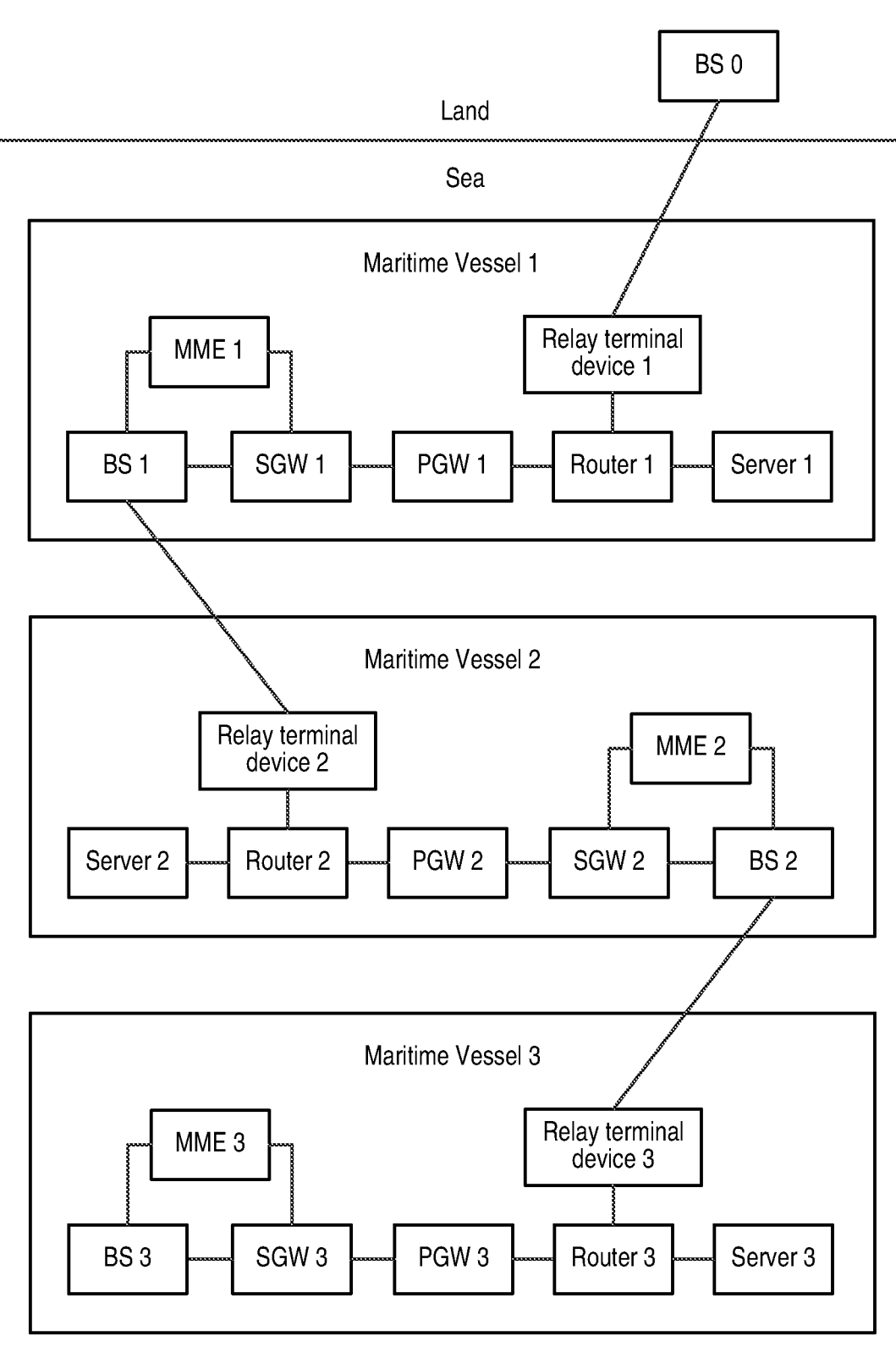
FIG. 1 is a diagram illustrating an exemplary communication system into which an embodiment of the disclosure is applicable.

FIG. 1 is a diagram showing an exemplary communication system into which an embodiment of the disclosure is applicable. As shown, the communication system comprises a base station on land and three maritime vessels (Maritime vessel 1, Maritime vessel 2 and Maritime vessel 3). Each maritime vessel comprises a base station, a mobility management entity (MME), a serving gateway (SGW), a packet data network (PDN) gateway (PGW), a router, a relay terminal device and a server (e.g. an application server or a mesh server). The base station can provide radio access communication links to terminal devices that are within its communication service cell. Examples of the base station may include, but not limited to, an evolved node B (eNB), a next generation node B (gNB), etc. For example, in a case where an eNB is deployed at a maritime vessel, compared with using other technologies such as WiFi to provide access for another maritime vessel, a super maritime wireless network with extended coverage (>100 km) can be provided without enhancement of terrestrial base stations. Only the base station on land is shown for brevity to represent the terrestrial network. The MME, the SGW and the PGW are merely exemplary components of the core network for illustration purpose. Some components of the core network such as a home subscriber server (HSS) are omitted for brevity. Some additional network elements such as an enterprise network management (ENM) may also be contained in the communication system. Although the core network is shown as part of an evolved packet core (EPC), any other suitable core network such as 5th generation core (5GC) may be used as the core network. Thus, the specific terms used herein do not limit the present disclosure only to the communication system related to the specific terms, which however can be more generally applied to other communication systems. The term mesh server may refer to a server which employs at least some aspect (e.g. peer discovering) of mesh technology. Although three maritime vessels are shown, the number of the maritime vessels may be two or more than three. The terms "maritime vessel" and "ship" may be interchangeably used herein. The number of each entity mentioned above in the maritime vessel may be more than one.

The relay terminal device 1 at Maritime vessel 1 can access the base station 0 on land and also act as an access point for other terminal device(s) at Maritime vessel 1. For example, any one of the relay terminal devices shown in FIG. 1 may be a customer premise equipment (CPE) capable of converting signals of one radio access technology (RAT) to signals of another RAT, such as converting LTE signals to WiFi signals. It is also possible that other terminal device(s) at Maritime vessel 1 may directly access the base station 0 on land. The relay terminal device 1 can be configured not to access the base station 1. The relay terminal device 1 can also relay traffic (e.g. data and/or signaling) between the core network 1 or the server 1 at Maritime vessel 1 and the terrestrial network. The router 1 at Maritime vessel 1 can route traffic between the core network 1, the relay terminal device 1 and the server 1 at Maritime vessel 1.

Similarly, the relay terminal device 2 at Maritime vessel 2 can access the base station 1 at Maritime vessel 1 and also act as an access point for other terminal device(s) at Maritime vessel 2. The relay terminal device 2 can be configured not to access the base station 2. The relay terminal device 2 can also relay traffic between the core network 2 or the server 2 at Maritime vessel 2 and the core network 1 or the server 1 at Maritime vessel 1. The router 2 at Maritime vessel 2 can route traffic between the core network 2, the relay terminal device 2 and the server 2 at Maritime vessel 2.

Likewise, the relay terminal device 3 at Maritime vessel 3 can access the base station 2 at Maritime vessel 2 and also act as an access point for other terminal device(s) at Maritime vessel 3. The relay terminal device 3 can be configured not to access the base station 3. The relay terminal device 3 can also relay traffic between the core network 3 or the server 3 at Maritime vessel 3 and the core network 2 or the server 2 at Maritime vessel 2. The router 3 at Maritime vessel 3 can route traffic between the core network 3, the relay terminal device 3 and the server 3 at Maritime vessel 3. In this way, a multi-hop network can be formed with the topology and coverage being self-organized.

Figure 2:
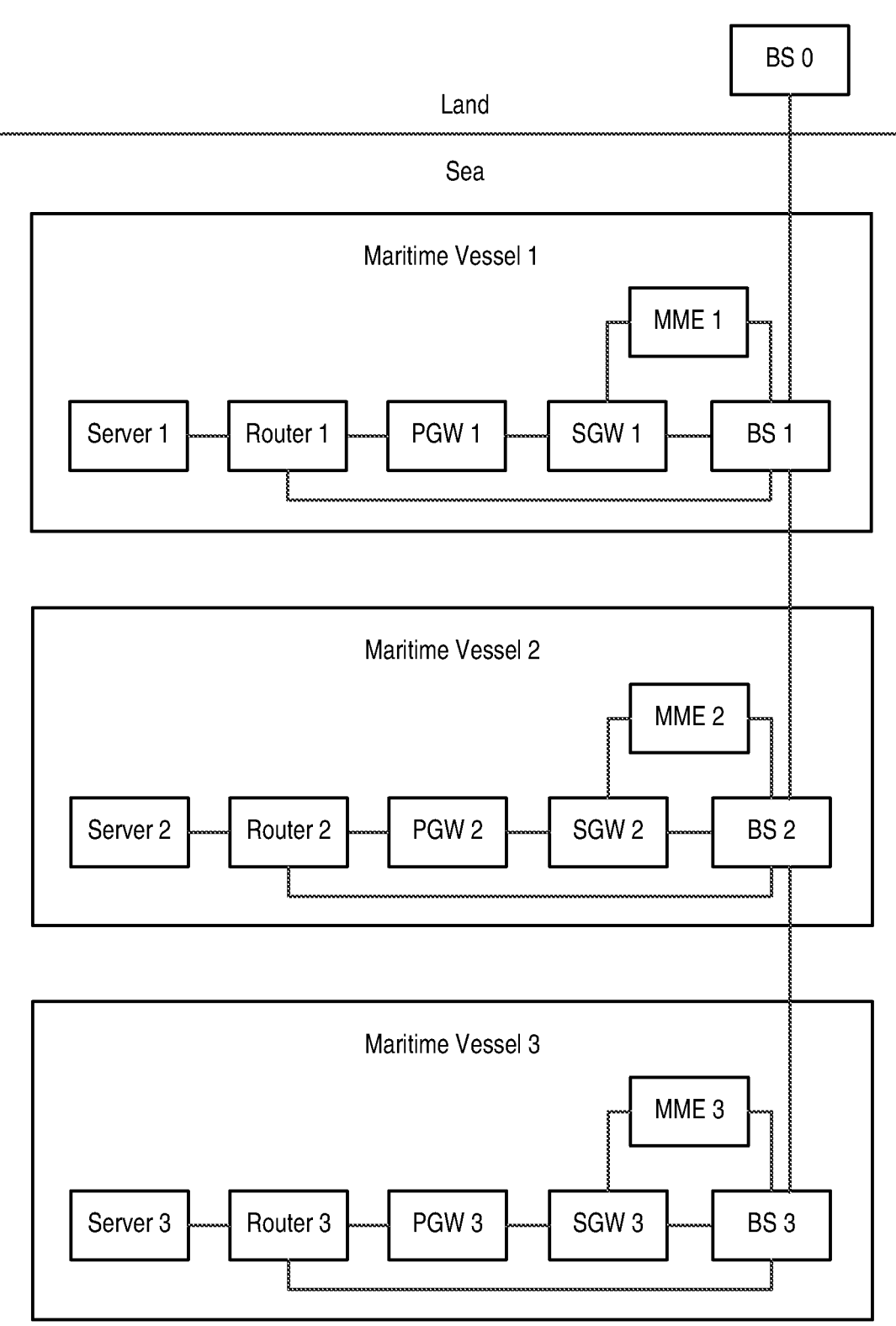
FIG. 2 is a diagram illustrating another exemplary communication system into which an embodiment of the disclosure is applicable.

Although embodiments of the disclosure will be described hereinafter with reference to FIG. 1, the present disclosure may also be applied to any other maritime communication system in which distances between ships' base stations vary with the sailing routes such that there is a possibility of occurrence of serious interference. For example, FIG. 2 illustrates another exemplary communication system into which an embodiment of the disclosure is applicable. In this communication system, each vessel comprises a special base station and a server. The special base station owns base station functionality and user terminal functionality. The special base station in a ship can be used to set up radio connection with another special base station in another ship and the special base station can provide radio connection to the local users in the same ship and the other special base station in the other ship. Within the base stations and the core networks on the ships, the signaling and service data information can be forwarded between each other. In this way, a wireless backhaul path to the base station in terrestrial network can be set up for the special base stations in different ships and communication information can be relayed to/from terrestrial network. The servers on different ships can connect with each other via the special base stations.

The term terminal device may also be referred to as, for example, device, access terminal, user terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

FIG. 3 is a flowchart illustrating a method performed by a first server according to an embodiment of the disclosure. The method may be applied to a network comprising the first server and a first base station at a first maritime vessel, and one or more second servers and one or more second base stations at one or more respective second maritime vessels. At block 302, in response to a trigger event indicating that interference between at least two base stations of the first base station and the one or more second base stations is serious, the first server determines a contribution value of the second base station to the network, based on information related to the network.

In a first case, the at least two base stations comprise the first base station and at least one second base station. For the first case, as an example, the trigger event may be that the first server receives, from a second relay terminal device served by the first base station, a first notification message (e.g. a measurement report) indicating that interference between the first base station and the at least one second base station is serious. The first notification message may be received by the first base station first and then transferred to the first server.

One criterion for the second relay terminal device to detect the serious interference may be that a received signal quality (or strength) from the at least one second base station (e.g. corresponding to an intra-frequency neighboring cell) which is not on the same maritime vessel as the second relay terminal device is greater than a first predetermined threshold. The signal quality may be expressed as reference signal receiving power (RSRP) or reference signal receiving quality (RSRQ) or signal to interference plus noise ratio (SINR), such as CRS-RSRP/RSRQ or CRS-SINR in LTE, synchronization signal block (SSB)-RSRP/RSRQ or SSB-SINR in NR, or channel state information reference signal (CSI-RS)-SINR or RS-SINR in sidelink, etc. In the scenario shown in FIG. 1, this criterion may mean that for the relay terminal device 2 served by the base station 1, the received signal quality from the base station 3 is greater than the first predetermined threshold.

Another criterion for the second relay terminal device to detect the serious interference may be that a received signal quality from the at least one second base station which is not on the same maritime vessel as the second relay terminal device is greater than a received signal quality from the first base station by a second predetermined threshold or more. In the scenario shown in FIG. 1, this criterion may mean that for the relay terminal device 2 served by the base station 1, the received signal quality from the base station 3 is greater than the received signal quality from the base station 1 by the second predetermined threshold or more. Note that the present disclosure is not limited to using an absolute threshold or an offset threshold to detect the serious interference and any other suitable criterion may be used instead or in combination.

In the above example of the trigger event, after receiving the first notification message, in addition to transferring it to the first server, the first base station may transfer it to the at least one second base station (or alternatively to the one or more second base stations) by broadcasting between base stations, or by integrated access and backhaul (IAB), or by any other suitable manner such as microwave link. In turn, the at least one second base station (or alternatively the one or more second base stations) may transfer the first notification message to the corresponding server(s) at the same maritime vessel(s). Alternatively, after receiving the first notification message, the first server may send a second notification message indicating the trigger event to the second server corresponding to the at least one second base station (or alternatively to the one or more second servers), since the first server and the one or more second servers are connected with each other.

As another example, the trigger event may be that the first server receives, from a first relay terminal device at the first maritime vessel, a first notification message indicating that interference between the first base station and the at least one second base station is serious. One criterion for the first relay terminal device to detect the serious interference may be that a received signal quality from the at least one second base station is greater than the first predetermined threshold. In the scenario shown in FIG. 1, this criterion may mean that for the relay terminal device 1, the received signal quality from the base station 2 is greater than the first predetermined threshold. In this example of the trigger event, the first server may constantly query the first relay terminal device through the UE application programming interface (API) for receiving the first notification message. Then the first server may send a second notification message to the second server corresponding to the at least one second base station (or alternatively to the one or more second servers). It is also possible that the second base station serving the first relay terminal device receives the first notification message from the first relay terminal device and then transfers it to the corresponding second server or the first base station. Then, the corresponding second server or the first base station transfers it to the first server.

In a second case, the at least two base stations comprise at least two second base stations. As described above for the first case, after a relay terminal device detects the serious interference and sends a notification message to its serving base station (or the server at the same ship receives the notification message by querying the relay terminal device), since base stations/servers at different maritime vessels in the network are connected with each other, a corresponding notification message can be sent to the destination server(s). Correspondingly, for the second case, the trigger event may be that the first server receives, from any one of the at least two second base stations or the corresponding second server, a notification message indicating that interference between the at least two second base stations is serious.

For example, the information related to the network may comprise positioning information of the first base station and the second base station. Examples of the positioning information may include, but not limited to, global navigation satellite system (GNSS) information, speed, direction (e.g. heading), distance between ships, and the like. The positioning information may be obtained from an automatic identification system (AIS) deployed at the first maritime vessel.

As another example, the information related to the network may comprise network configuration information of the first base station and the second base station. Examples of the network configuration information may include, but not limited to, cell identity (ID), physical cell identity (PCI), and the like. For example, every base station (or server) of the network may share its network configuration information with other base stations (or servers) such that the network configuration information of the whole network can be obtained.

As yet another example, the information related to the network may comprise connection status information indicating connection status between the first base station and the second base station. Examples of the connection status information may include, but not limited to, link relationship between the first base station and the second base station. For example, every base station (or server) of the network may share its link relationship (relative to the connected maritime vessel(s)) with other base stations (or servers) such that the connection status information of the whole network can be obtained.

As yet another example, the information related to the network may comprise interference information indicating interference between the first base station and the second base station. As described above with respect to the trigger event, the interference information (e.g. a measurement report) may be reported by the relay terminal device that is served by the first base station or located at the first maritime vessel. As yet another example, the information related to the network may comprise a combination of any two or more of the positioning information, the network configuration information, the connection status information and the interference information.

As an exemplary example, the positioning information, the network configuration information and the connection status information may be exchanged between the servers of the network via application layer to establish a real-time network topology structure diagram. For example, every cell may continuously broadcast information expressed as two tables. The first table includes connection relations which contain two parts: the connection relation between the relay terminal device of the same ship and the cell which this relay terminal device is connecting; and the connection relation heard by the relay terminal device from the tables broadcast by the connected cell. An exemplary example of the first table may be shown as below.

| Connection relation | |
| --- | --- |
| From | To |
| Cell_1 | RELAY TERMINAL_2 |
| Cell_2 | RELAY TERMINAL_3 |
| Cell_3 | RELAY TERMINAL_4 |
| Cell_4 | RELAY TERMINAL_5 |
| Cell_6 | RELAY TERMINAL_10 |

The second table includes detailed information on cell-level. An exemplary example of the second table may be shown as below. For brevity, there are no specific details filled in the table below.

| | Global cell ID | PCI | Latitude | Longitude | Direction | Speed | Maritime cell |
| --- | --- | --- | --- | --- | --- | --- | --- |
| Cell_1 | | | | | | | |
| Cell_2 | | | | | | | |
| Cell_3 | | | | | | | |
| Cell_4 | | | | | | | |
| Cell_6 | | | | | | | |
| Cell_10 | | | | | | | |

Note that in one ship, the number of cells may be more than one. So each cell may have a cell_sequence, which starts from zero. The maritime cell may refer to a combination of the ship's ID and the cell_sequence. For example, in AIS, every ship has a unique ID which may be reused as the ship's ID.

For the above first case, there may be two options for the determination at block 302. As the first option, the first server determines a contribution value of the at least one second base station to the network, based on the information related to the network. That is, "the second server" mentioned in block 302 may refer to the at least one second base station in the first option. As the second option, the first server determines contribution values of the one or more second base stations to the network, based on the information related to the network. That is, "the second server" mentioned in block 302 may refer to the one or more second base stations in the second option.

For the above second case, there may be also two options for the determination at block 302. As the first option, the first server determines contribution values of the at least two second base stations to the network, based on the information related to the network. That is, "the second server" mentioned in block 302 may refer to the at least two second base stations in the first option. As the second option, the first server determines contribution values of the one or more second base stations to the network, based on the information related to the network. That is, "the second server" mentioned in block 302 may refer to the one or more second base stations in the second option.

For both cases, block 302 may be implemented by performing blocks 406-408 of FIG. 4. At block 406, the first server determines, for the second base station, scores of one or more of the positioning information, the network configuration information, the connection status information and the interference information. As described above, for the first case, "the second base station" in block 406 may refer to any one of the at least one second base station in the first option, or any one of the one or more second base stations in the second option. For the second case, "the second base station" in block 406 may refer to any one of the at least two second base stations in the first option, or any one of the one or more second base stations in the second option.

For example, the score of the positioning information may be determined as a function of relative moving direction between the first and the second base station. For ease of explanation, hereinafter it is supposed that the greater the contribution value is, the greater the contribution of the second base station to the network is. Then, the score of the positioning information indicating that the first and the second base station move away from each other may be determined to be greater than the score of the positioning information indicating that the first and the second base station move towards each other. This is because the first and the second base station moving away from each other means lower possibility of interference, which makes greater contribution to the performance (especially the stability) of the network. As an exemplary example, the score $\overline{\omega}_k{}^{(i)}$ and the normalized score $SC_k{}^i 1$ of the positioning information calculated by node i ship for node k ship (reference ship) may be expressed as:

$$\overline{\omega}_k^{(i)} = \alpha \left\| D\left(\overrightarrow{w}_k^{lat,log} - \overrightarrow{w}_i^{lat,log}\right)\right\| + \beta \left\| S(\overrightarrow{w}_k - \overrightarrow{w}_i)\right\|,$$

$$SC_k^i 1 = \frac{-1}{\left|-\sum_{i=1}^{N} \overline{\omega}_k^{(i)} \log \overline{\omega}_k^{(i)}\right|} \overline{\omega}_k^{(i)} \log \overline{\omega}_k^{(i)},$$

where $\overrightarrow{w}_k^{lat\ Job}$ is a vector containing the latitude and longitude of node k ship, $\overrightarrow{w}_i^{lat\ Jog}$ is a vector containing the latitude and longitude of node i ship, $\overrightarrow{w}_k$ is an instantaneous speed vector of node k ship, $\overrightarrow{w}_i$ is an instantaneous speed vector of node i ship, D( ) and S( ) are scalar performance functions between node k ship and node i ship, D( ) can calculate a vector between node k ship and node i ship and transform this vector expressed in latitude and longitude to a vector expressed in rectangular plane coordinates, S( ) can calculate an instantaneous speed vector between node k ship and node i ship, ‖ ‖ represents the norm of a vector, α and β are weighting factors for distance and speed respectively. The parameter N is the number of ship pairs in the network. In each ship pairs, one ship calculates the score for the other ship.

For example, the score of the network configuration information may be determined as a function of PCIs of the first and the second base station. In this case, the score of the network configuration information indicating that the PCIs of the first and the second base station belong to different PCI groups may be determined to be greater than the score of the network configuration information indicating that the PCIs of the first and the second base station belong to the same PCI group. This is because the first and the second base station belonging to different PCI groups means lower possibility of PCI collision, which makes greater contribution to the performance (especially the stability) of the network.

For example, the score of the connection status information may be determined as a function of link relationship between the first and the second base station. In this case, the score of the connection status information indicating that the second base station acts as a backhaul node of the first base station may be determined to be greater than the score of the connection status information indicating that the first base station acts as a backhaul node of the second base station. This is because the second base station acting as a backhaul node of the first base station means the second base station makes greater contribution to the performance (especially the stability) of the network.

For example, the score of the interference information may be determined as a function of the indicated interference. The stronger the interference between the first and the second base station is, the smaller the score of the interference information may be determined to be.

At block 408, the first server determines, as the contribution value of the second base station, a weighted sum of the determined scores. Suppose the weight for the positioning information is W1, the weight for the network configuration information is W2, the weight for the connection status information is W3, and the weight for the interference information is W4. Then, as an exemplary example, the relationship between the four weights may be expressed as: W4 (e.g. 0.4)>W3 (e.g. 0.3)>W1 (e.g. 0.2)>W2 (e.g. 0.1). Note that the present disclosure is not limited to this example and any other relationship between the weights and the specific values of the weights may be configured or adjusted depending on the specific application scenario. Also note that when the information related to the network comprises only one of the four types of information, the weighted sum becomes the determined score for this type of information. Suppose for the link "ship B1↔ship B2", ship B2 determines that: for ship B1, the score of the positioning information is SC1, the score of the network configuration information is SC2, the score of the connection status information is SC3, and the score of the interference information is SC4. Then, the contribution value CV_B1 of ship B1 determined by ship B2 can be expressed as:

$$CV\_B1=W1*SC1+W2*SC2+W3*SC3+W4*SC4.$$

Referring back to FIG. 3, at block 304, the first server sends the determined contribution value of the second base station to at least the second server corresponding to the second base station. The determined contribution value may be sent through (e.g. LTE) broadcasting between base stations, or IAB, or any other communication technologies such as microwave link. For the first case, in the above first option for block 302, the first server sends the determined contribution value of the at least one second base station to the second server corresponding to the at least one second base station. In the above second option, the first server sends the determined contribution values of the one or more second base stations to the one or more second servers. For the second case, in the above first option for block 302, the first server sends the determined contribution values of the at least two second base stations to the second servers corresponding to the at least two second base stations. In the above second option, the first server sends the determined contribution values of the one or more second base stations to the one or more second servers. With the method of FIG. 3, since the determined contribution value(s) are sent, it is possible for the second server to determine whether power reduction or power off is needed for the corresponding second base station.

Since the terms "first" and "second" are only used to distinguish one server (or base station) from another server (or base station), at least one aspect of the present disclosure provides a method shown in FIG. 5. The method may be applied to a network comprising the second server and a second base station at a second maritime vessel, and one or more first servers and one or more first base stations at one or more respective first maritime vessels. At block 502, in response to a trigger event indicating that interference between at least two base stations of the second base station and the one or more first base stations is serious, the second server determines a contribution value of the first base station to the network, based on information related to the network. At block 504, the second server sends the determined contribution value of the first base station to at least the first server corresponding to the first base station. With the method of FIG. 5, since the determined contribution value(s) are sent, it is possible for the first server to determine whether power reduction or power off is needed for the corresponding first base station.

FIG. 6 is a flowchart illustrating a method performed by a first server according to an embodiment of the disclosure. The method may be applied to a network comprising the first server and a first base station at a first maritime vessel, and one or more second servers and one or more second base stations at one or more respective second maritime vessels. At block 602, in response to a trigger event indicating that interference between at least two base stations of the first base station and the one or more second base stations is serious, the first server obtains a contribution value of the first base station to the network determined by the second server.

The trigger event has been described above with respect to block 302 and its details are omitted here. Similar to block 302, the at least two base stations comprise the first base station and at least one second base station in the first case and there may be two options for the first case. As the first option, the first server obtains a contribution value of the first base station to the network determined by the at least one second server. That is, "the second server" mentioned in block 602 may refer to the second server corresponding to the at least one second base station in the first option. As the second option, the first server obtains contribution values of the first base station to the network determined by the one or more second servers. That is, "the second server" mentioned in block 602 may refer to the one or more second servers in the second option.

Similar to block 302, the at least two base stations comprise at least two second base stations in the second case. For the second case, the first server obtains contribution values of the first base station to the network determined by the one or more second servers. That is, "the second server" mentioned in block 602 may refer to the one or more second servers in the second case.

At block 604, the first server determines whether the first base station needs power reduction or power off based at least on the obtained contribution value of the first base station. As an option, the determination at block 604 may be based on comparison between the contribution value of the first base station and a predetermined contribution threshold. For both cases mentioned above, it is possible that the first server receives multiple contribution values of the first base station determined by different second servers. In this case, the first server may determine a comprehensive contribution value based on the received multiple contribution values. For example, a weighted average of the multiple contribution values may be calculated as the comprehensive contribution value. Note that if the first server receives only one contribution value of the first base station, the comprehensive contribution value may equal to this received contribution value. Then, the first server may compare the comprehensive contribution value and the predetermined contribution threshold. If the comprehensive contribution value of the first base station is smaller than the predetermined contribution threshold, the first server may determine that the first base station needs power reduction or power off. Otherwise, the first server may determine that the first base station does not need power reduction or power off.

When determining that the first base station needs power reduction or power off, the first server sends an instruction for power reduction or power off to the first base station at block 606. With the method of FIG. 6, the interference of the network can be reduced by using an interference self-controlling mechanism.

For ease of understanding, suppose there are 5 ships (Ship 1 to Ship 5) in the network, the base station at Ship i (i=1, 2, 3, 4, 5) is called BS i, and the server at Ship i is called Server i. Also suppose serious interference only occurs between Ship 1 and Ship 2 and between Ship 1 and Ship 3. For this exemplary scenario, in a first example, Server 1 determines a contribution value CV_1_2 for BS 2 and a contribution value CV_1_3 for BS 3 (according to block 302, the first case, the first option). Server 1 sends CV_1_2 to server 2 and sends CV_1_3 to server 3 (according to block 304, the first case, the first option). Similarly, server 2 determines a contribution value CV_2_1 for BS 1 and sends CV_2_1 to Server 1. Server 3 determines a contribution value CV_3_1 for BS 1 and sends CV_3_1 to Server 1. Thus, Server 1 obtains two contribution values CV_2_1 and CV_3_1 and determines a comprehensive contribution value and compares it with the predetermined contribution threshold. Server 2 obtains one contribution value CV_1_2 and compares it with the predetermined contribution threshold. Server 3 also obtains one contribution value CV_1_3 and compares it with the predetermined contribution threshold.

In a second example, Server 1 performs the same operations as in the first example. Server 2 determines CV_2_1 for BS 1 (according to block 302, the first case, the first option) and CV_2_3 for BS 3 (according to block 302, the second case, the first option). Server 2 sends CV_2_1 to Server 1 (according to block 304, the first case, the first option) and sends CV_2_3 to server 3 (according to block 304, the second case, the first option). Similarly, Server 3 determines CV_3_1 for BS 1 and CV_3_2 for BS 2. Server 3 sends CV_3_1 to Server 1 and sends CV_3_2 to Server 2. Thus, each of the three servers obtains two contribution values, determines a comprehensive contribution value and compares it with the predetermined contribution threshold.

In a third example, in addition to the mutual evaluation between the three servers as described in the second example, Server 4 determines CV_4_1 for BS 1, CV_4_2 for BS 2 and CV_4_3 for BS 3 (according to block 302, the second case, the first option). Server 4 sends CV_4_1 to Server 1, sends CV_4_2 to server 2 and sends CV_4_3 to Server 3 (according to block 304, the second case, the first option). Similarly, Server 5 determines CV_5_1 for BS 1, CV_5_2 for BS 2 and CV_5_3 for BS 3. Server 5 sends CV_5_1 to Server 1, sends CV_5_2 to server 2 and sends CV_5_3 to Server 3. Thus, each of the three servers obtains four contribution values, determines a comprehensive contribution value and compares it with the predetermined contribution threshold.

In a fourth example, every server determines a contribution value for each of the other base stations excluding the base station at the same ship and sends the determined contribution value to the corresponding server. For example, in addition to the determination and sending of CV_1_2 and CV_1_3 as described in the first example, Server 1 further determines CV_1_4 for BS 4 and CV_1_5 for BS 5 (according to block 302, the first case, the second option). Server 1 sends CV_1_4 to Server 4 and sends CV_1_5 to Server 5 (according to block 304, the first case, the second option). Thus, each of the five servers obtains four contribution values, determines a comprehensive contribution value and compares it with the predetermined contribution threshold.

FIG. 7 is a flowchart illustrating a method performed by a first server according to an embodiment of the disclosure. The method may be applied to a network comprising the first server and a first base station at a first maritime vessel, and one or more second servers and one or more second base stations at one or more respective second maritime vessels. As shown, the method comprises blocks 302-304, 712, 602, 714, 716 and 606. At block 302, in response to a trigger event indicating that interference between at least two base stations of the first base station and the one or more second base stations is serious, the first server determines a contribution value of the second base station to the network, based on information related to the network. At block 304, the first server sends the determined contribution value of the second base station to at least the second server corresponding to the second base station. Blocks 302 and 304 have been described above and their details are omitted here.

At block 712, the first server sends a second notification message indicating the trigger event to at least the second server corresponding to the at least one second base station. The second notification message may be alternatively sent to the one or more second servers. As described above, either the first server or the first base station may send a corresponding notification message to the destination server(s). Thus, block 712 is an optional block of the method shown in FIG. 7.

At block 602, in response to the trigger event, the first server obtains a contribution value of the first base station to the network determined by the second server. Block 602 has been described above and its details are omitted here. At block 714, the first server obtains a contribution value of the second base station to the network determined by at least one of the one or more second servers excluding the second server corresponding to the second base station. Similar to block 602, there may be two cases for block 714. In the first case, the at least two base stations comprise the first base station and at least two second base stations. In the second case, the at least two base stations comprise at least two second base stations. For both cases, the contribution value(s) mutually evaluated between the at least two second base stations may be obtained.

For ease of understanding of block 714, for the exemplary scenario with five ships as described above, in a fifth example, in addition to the operations performed in the second example, Server 1 may further receive CV_2_3 from Server 2 and CV_3_2 from Server 3. Server 2 may further receive CV_1_3 from Server 1 and CV_3_1 from Server 3. Server 3 may further receive CV_1_2 from Server 1 and CV_2_1 from Server 2.

In a sixth example, in addition to the operations performed in the third example, Server 1 may further receive CV_2_3 from Server 2, CV_3_2 from Server 3, CV_4_2 and CV_4_3 from Server 4, CV_5_2 and CV_5_3 from Server 5. Server 2 may further receive CV_1_3 from Server 1, CV_3_1 from Server 3, CV_4_1 and CV_4_3 from Server 4, CV_5_1 and CV_5_3 from Server 5. Server 3 may further receive CV_1_2 from Server 1, CV_2_1 from Server 2, CV_4_1 and CV_4_2 from Server 4, CV_5_1 and CV_5_2 from Server 5.

In a seventh example, in addition to the operations performed in the fourth example, Server 1 may further receive CV_2_3, CV_2_4 and CV_2_5 from Server 2, CV_3_2, CV_3_4 and CV_3_5 from Server 3, CV_4_2, CV_4_3 and CV_4_5 from Server 4, CV_5_2, CV_5_3 and CV_5_4 from Server 5. The contribution values received by each of Server 2 to Server 5 may be determined similarly.

At block 716, the first server determines whether the first base station needs power reduction or power off based on the obtained contribution value of the first base station, the determined contribution value of the second base station, the obtained contribution value of the second base station. For example, the determination at block 716 may be based on comparison between the contribution value of the first base station and the contribution value of the second base station. As described above with respect to block 604, it is possible that the first server receives multiple contribution values of the first base station determined by different second servers. In this case, the first server may determine a comprehensive contribution value based on the received multiple contribution values. Similarly, for a second base station, there may be multiple contribution values of the second base station determined by different servers. In this case, the first server may also determine a comprehensive contribution value for the second base station.

Since block 714 means there are at least two second base stations, "the second base station" mentioned in block 716 may refer to the at least two second base stations. This means the comparison is performed between the comprehensive contribution value of the first base station and the comprehensive contribution values of the at least two second base stations. For example, from the first base station and the at least two second base stations, one or more base stations having the lowest comprehensive contribution values may be determined to need power reduction or power off.

Optionally, some additional factors may be further considered when the determination at block 716 is performed. For example, the first server may determine that the first base station does not need power reduction or power off, when multiple base stations within a predetermined geographical area need power reduction or power off according to the comparison, but the first base station in the multiple base stations has the highest contribution to the network. As another example, the first server may determine that the first base station does not need power reduction or power off when the first base station is the only one base station among the first base station and the one or more second base stations that is connected directly with a backhaul node on land.

When determining that the first base station needs power reduction or power off, the first server sends an instruction for power reduction or power off to the first base station at block 606. With the method of FIG. 7, the interference of the network can be significantly reduced via coordination of the network.

Note that for the exemplary scenario with five ships as described above, in the first to third examples, after a server determines a comprehensive contribution value for its corresponding base station, the server may share it with the other two servers such that the comprehensive contribution values of the three base stations are known to each of the three servers. Then, by comparison between the comprehensive contribution values of the three base stations, each server can determine whether its corresponding base station needs power reduction or power off.

Likewise, in the fourth example, after a server determines a comprehensive contribution value for its corresponding base station, the server may share it with the other four servers such that the comprehensive contribution values of the five base stations are known to each of the five servers. Then, by comparison between the comprehensive contribution values of the five base stations, each server can determine whether its corresponding base station needs power reduction or power off.

FIG. 8 is a flowchart illustrating a method performed by a first server according to an embodiment of the disclosure. The method may be applied to a network comprising the first server and a first base station at a first maritime vessel, and one or more second servers and one or more second base stations at one or more respective second maritime vessels. As shown, the method comprises blocks 602-604 and 818. Blocks 602-604 have been described above and their details are omitted here. When a predetermined condition is satisfied after sending the instruction for power reduction or power off to the first base station, the first server sends an instruction for recovering normal operation to the first base station at block 818. As an example, the predetermined condition may be at least one of the one or more second base stations being disconnected from the network. As another example, the predetermined condition may be at least one of the one or more second base stations being disconnected from the network for a first predetermined time period. As yet another example, predetermined condition may be a second predetermined time period having elapsed since the instruction for power reduction or power off is sent to the first base station. With the method of FIG. 8, the maritime communication can be maintained with a stable and recoverable performance.

As an exemplary example, after taking the action of power reduction or power off, the first server may monitor the mesh topology of the network. If there is no base station getting out of connection after taking the action of power reduction or power off, the first server may review the network condition. If the trigger event indicating the serious interference occurs, blocks 602-606 may be performed again. If there is any base station getting out of connection or such out-of-connection event continues a certain period of time after taking the action of power reduction or power off, the base stations of the network may be classified by clusters according to geographical information and also optionally according to geofence area radius if necessary. In a specific cluster, the power-down or power-reduced base station(s) may be powered up or be increased in power to mitigate the out-of-connection status.

Figure 9:
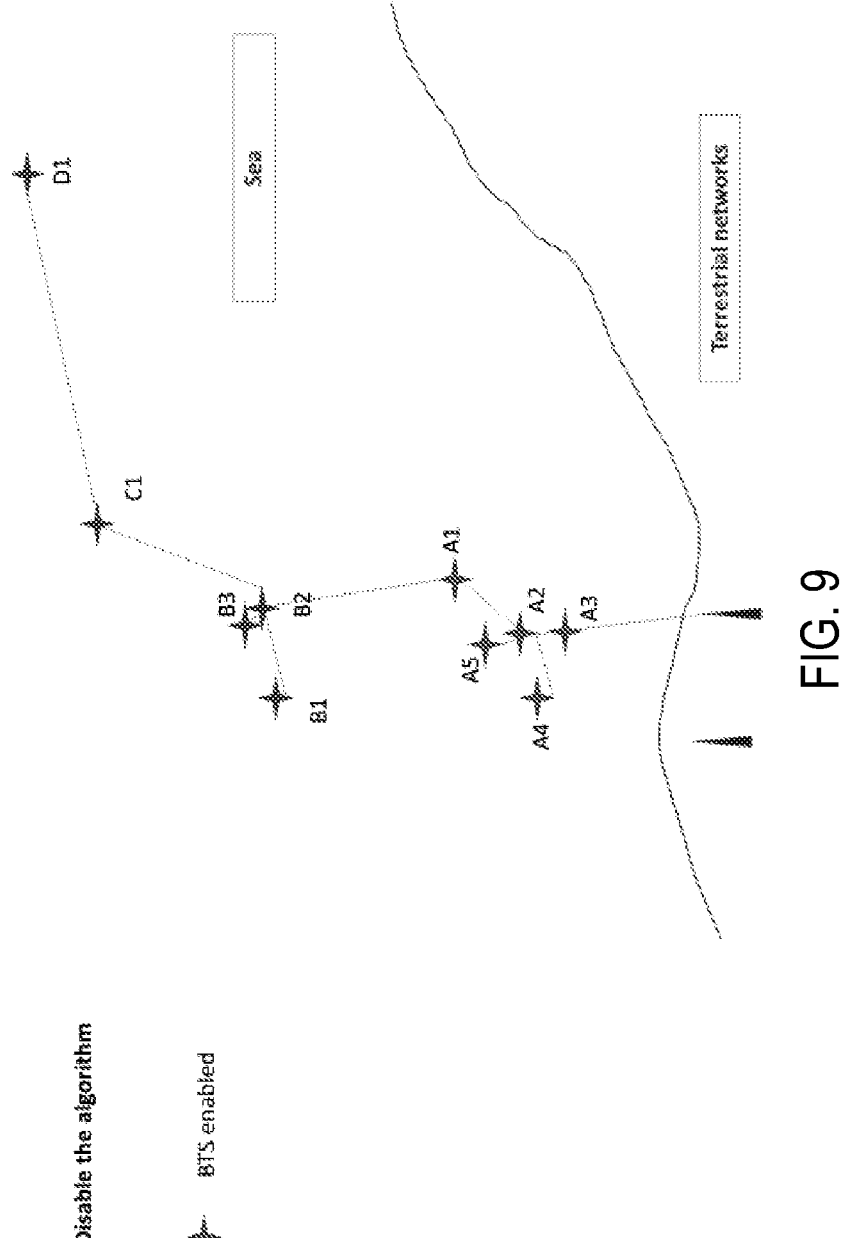
FIG. 9 is a diagram illustrating a scenario where an embodiment of the disclosure is not applied.
Figure 10:
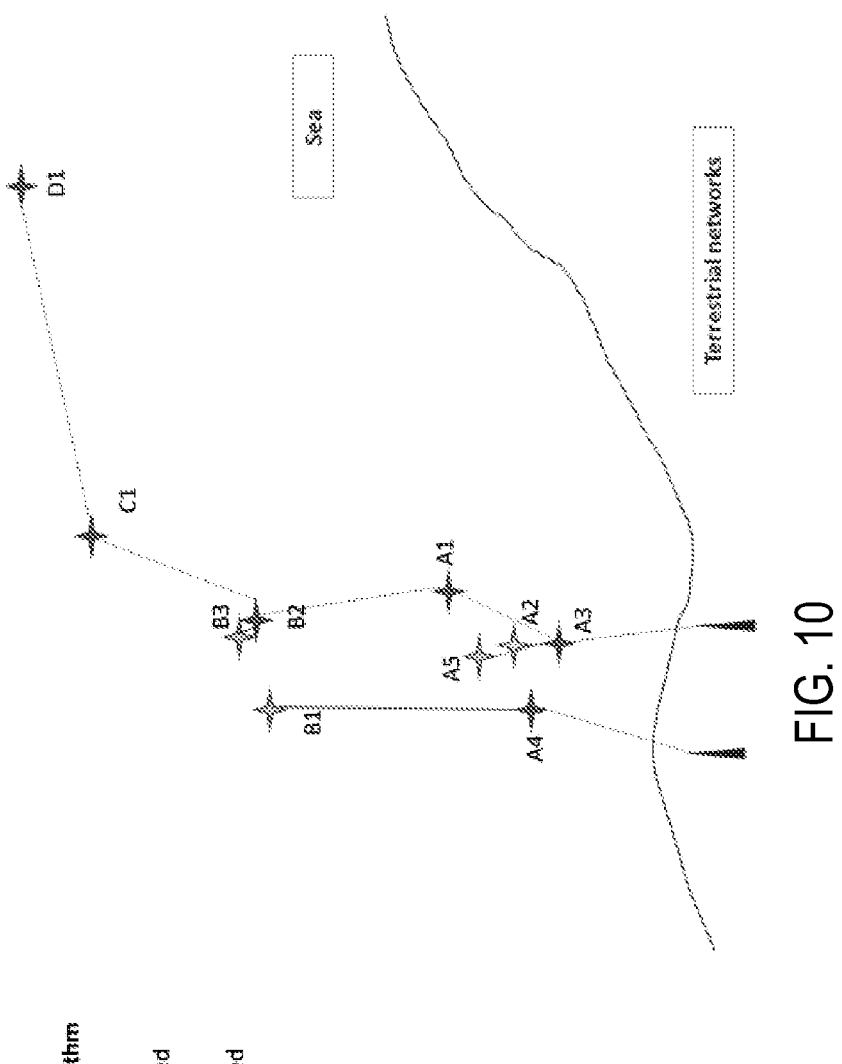
FIG. 10 is a diagram illustrating a scenario where an embodiment of the disclosure is applied.

FIG. 9 is a diagram illustrating a scenario where an embodiment of the disclosure is not applied. As shown, all the base stations A1-A5, B1-B3, C1 and D1 are in normal operation. In contrast, FIG. 10 is a diagram illustrating a scenario where an embodiment of the disclosure is applied. As shown, by applying the embodiment of disclosure such as shown in FIG. 8, base stations A2, A5, B1 and B3 are powered down. Furthermore, because geographically adjacent sites are not recommended to be selected as series candidates for power reduction or power off, base stations B1, B2 and B3 are not selected simultaneously as the candidates. In addition, because the only one base station in a specific geographical area (e.g. a specific geofence) is recommended to be skipped as the candidate for comparison of comprehensive contribution values or for power reduction or power off, the base station C1 is not powered down.

Figure 11:
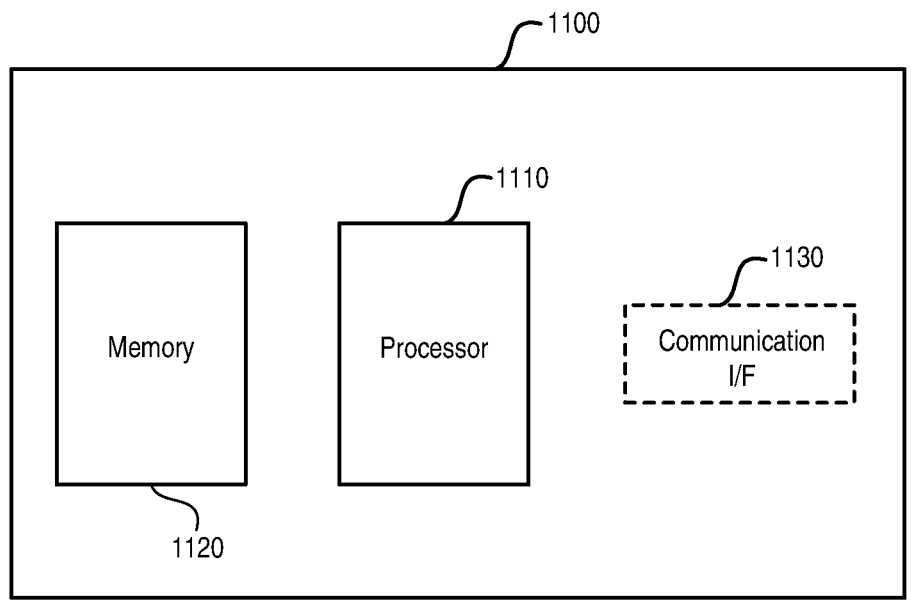
FIG. 11 is a block diagram showing an apparatus suitable for use in practicing some embodiments of the disclosure.

FIG. 11 is a block diagram showing an apparatus suitable for use in practicing some embodiments of the disclosure. For example, any one of the first server and the second server described above may be implemented through the apparatus 1100. As shown, the apparatus 1100 may include a processor 1110, a memory 1120 that stores a program, and optionally a communication interface 1130 for communicating data with other external devices through wired and/or wireless communication.

The program includes program instructions that, when executed by the processor 1110, enable the apparatus 1100 to operate in accordance with the embodiments of the present disclosure, as discussed above. That is, the embodiments of the present disclosure may be implemented at least in part by computer software executable by the processor 1110, or by hardware, or by a combination of software and hardware.

The memory 1120 may be of any type suitable to the local technical environment and may be implemented using any suitable data storage technology, such as semiconductor based memory devices, flash memories, magnetic memory devices and systems, optical memory devices and systems, fixed memories and removable memories. The processor 1110 may be of any type suitable to the local technical environment, and may include one or more of general purpose computers, special purpose computers, microprocessors, digital signal processors (DSPs) and processors based on multi-core processor architectures, as non-limiting examples.

Figures 12, 13:
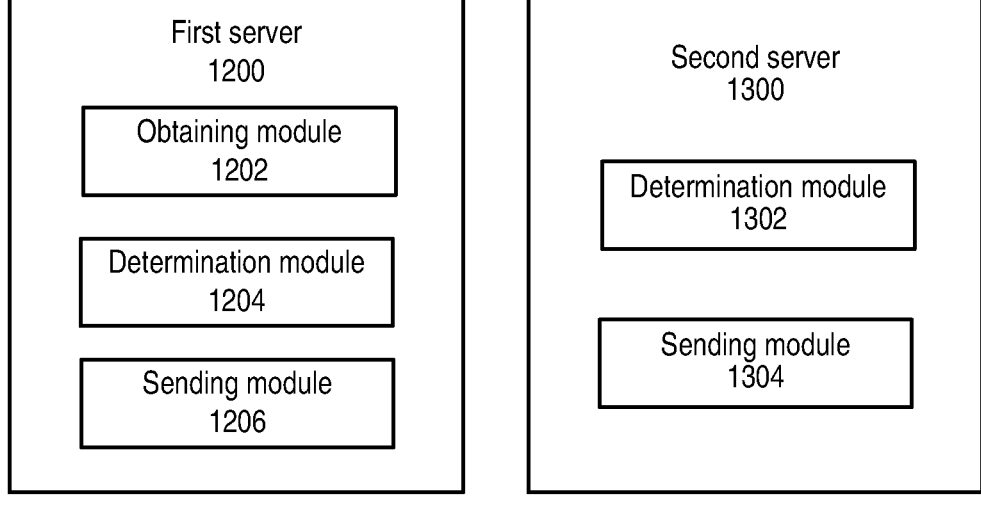
FIG. 12 is a block diagram showing a first server according to an embodiment of the disclosure.
FIG. 13 is a block diagram showing a second server according to an embodiment of the disclosure.

FIG. 12 is a block diagram showing a first server according to an embodiment of the disclosure. The first server may be used in a network comprising the first server and a first base station at a first maritime vessel, and one or more second servers and one or more second base stations at one or more respective second maritime vessels. As shown, the first server 1200 comprises an obtaining module 1202, a determination module 1204 and a sending module 1206. The obtaining module 1202 may be configured to, in response to a trigger event indicating that interference between at least two base stations of the first base station and the one or more second base stations is serious, obtain a contribution value of the first base station to the network determined by the second server, as described above with respect to block 602. The determination module 1204 may be configured to determine whether the first base station needs power reduction or power off based at least on the obtained contribution value, as described above with respect to block 604. The sending module 1206 may be configured to, when determining that the first base station needs power reduction or power off, send an instruction for power reduction or power off to the first base station, as described above with respect to block 606.

FIG. 13 is a block diagram showing a second server according to an embodiment of the disclosure. The second server may be used in a network comprising the second server and a second base station at a second maritime vessel, and one or more first servers and one or more first base stations at one or more respective first maritime vessels. As shown, the second server 1300 comprises a determination module 1302 and a sending module 1305. The determination module 1302 may be configured to, in response to a trigger event indicating that interference between at least two base stations of the second base station and the one or more first base stations is serious, determine a contribution value of the first base station to the network, based on information related to the network, as described above with respect to block 502. The sending module 1304 may be configured to send the determined contribution value of the first base station to at least the first server corresponding to the first base station, as described above with respect to block 504. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/ or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a first server in a network, the network comprising the first server and a first base station at a first maritime vessel, and one or more second servers and one or more second base stations at one or more respective second maritime vessels, the method comprising:

in response to receiving, from a second relay terminal device served by the first base station, a first notification message indicating a trigger event associated with interference between at least two base stations of the first base station and the one or more second base stations, obtaining a contribution value of the first base station to a performance of the network determined by the second server based on information related to the network, wherein the at least two base stations comprise the first base station and at least one second base station, wherein the contribution value of the first base station is based on one or more of:

positioning information of the first base station and the second base station;

network configuration information of the first base station and the second base station;

connection status information indicating connection status between the first base station and the second base station; and interference information indicating interference between the first base station and the second base station;

determining whether the first base station needs power reduction or power off based at least on the obtained contribution value; and when determining that the first base station needs power reduction or power off, sending an instruction for power reduction or power off to the first base station.

2. The method according to claim 1, wherein the at least two base stations comprise at least two second base stations.

3. The method according to claim 1, further comprising:

determining a contribution value of the second base station to the performance of the network based on the information related to the network; and sending the determined contribution value of the second base station to at least the second server corresponding to the second base station.

4. The method according to claim 3, wherein the determined contribution value of the second base station is sent to the one or more second servers.

5. The method according to claim 3, wherein the determining whether the first base station needs power reduction or power off is based further on the determined contribution value of the second base station.

6. The method according to claim 5, wherein the determining whether the first base station needs power reduction or power off is based on comparison between the contribution value of the first base station and the contribution value of the second base station.

7. The method according to claim 6, wherein the first server determines that the first base station does not need power reduction or power off, when multiple base stations within a predetermined geographical area need power reduction or power off according to the comparison, but the first base station in the multiple base stations has the highest contribution to the network.

8. The method according to claim 3, wherein determining the contribution value of the second base station to the performance of the network comprises:

determining, for the second base station, scores of one or more of the positioning information, the network configuration information, the connection status information and the interference information; and determining, as the contribution value of the second base station, a weighted sum of the determined scores.

9. The method according to claim 8, wherein the positioning information indicates relative moving direction between the first and the second base station; and wherein the score of the positioning information indicating that the first and the second base station move away from each other is greater than the score of the positioning information indicating that the first and the second base station move towards each other.

10. The method according to claim 8, wherein the network configuration information indicates physical cell identities, PCIs, of the first and the second base station; and wherein the score of the network configuration information indicating that the PCIs of the first and the second base station belong to different PCI groups is greater than the score of the network configuration information indicating that the PCIs of the first and the second base station belong to the same PCI group.

11. The method according to claim 1, further comprising:

obtaining a contribution value of the second base station to the network determined by at least one of the one or more second servers excluding the second server corresponding to the second base station; and wherein the determining whether the first base station needs power reduction or power off is based further on the obtained contribution value of the second base station.

12. The method according to claim 1, further comprising:
sending a second notification message indicating the trigger event to at least the second server corresponding to the at least one second base station.

13. The method according to claim 1, wherein for the second relay terminal device, a received signal quality from the at least one second base station which is not on the same maritime vessel as the second relay terminal device is greater than a first predetermined threshold; or
wherein for the second relay terminal device, a received signal quality from the at least one second base station which is not on the same maritime vessel as the second relay terminal device is greater than a received signal quality from the first base station by a second predetermined threshold or more.

14. The method according to claim 1, further comprising:
when a predetermined condition is satisfied after sending the instruction for power reduction or power off to the first base station, sending an instruction for recovering normal operation to the first base station.

15. The method according to claim 14, wherein the predetermined condition is one of:
at least one of the one or more second base stations being disconnected from the network;
at least one of the one or more second base stations being disconnected from the network for a first predetermined time period; and
a second predetermined time period having elapsed.

16. The method according to claim 1, wherein the contribution value of the first base station to the performance of the network is a weighted sum of one or more of:
a score of the positioning information of the first base station and the second base station;
a score of the network configuration information of the first base station and the second base station;
a score of the connection status information indicating connection status between the first base station and the second base station; and
a score of the interference information indicating interference between the first base station and the second base station.

17. The method according to claim 16, wherein the positioning information indicates relative moving direction between the first and the second base station; and
wherein the score of the positioning information indicating that the first and the second base station move away from each other is greater than the score of the positioning information indicating that the first and the second base station move towards each other.

18. The method according to claim 16, wherein the network configuration information indicates physical cell identities, PCIs, of the first and the second base station; and
wherein the score of the network configuration information indicating that the PCIs of the first and the second base station belong to different PCI groups is greater than the score of the network configuration information indicating that the PCIs of the first and the second base station belong to the same PCI group.

19. A method performed by a second server in a network, the network comprising the second server and a second base station at a second maritime vessel, and one or more first servers and one or more first base stations at one or more respective first maritime vessels, the method comprising:

in response to a trigger event indicating that interference between at least two base stations of the second base station and the one or more first base stations, determining a contribution value of the first base station to a performance of the network based on information related to the network, wherein the at least two base stations comprise the first base station and at least one second base station, wherein the contribution value of the first base station is based on one or more of:
positioning information of the first base station and the second base station;
network configuration information of the first base station and the second base station;
connection status information indicating connection status between the first base station and the second base station; and
interference information indicating interference between the first base station and the second base station; and
sending, to at least the first server corresponding to the first base station, a first notification message indicating the determined contribution value of the first base station.

20. A first server in a network, the network comprising the first server and a first base station at a first maritime vessel, and one or more second servers and one or more second base stations at one or more respective second maritime vessels, the first server comprising:
at least one processor; and
at least one memory, the at least one memory containing instructions executable by the at least one processor, whereby the first server is operative to:
in response to receiving, from a second relay terminal device served by the first base station, a first notification message indicating interference between at least two base stations of the first base station and the one or more second base stations, obtain a contribution value of the first base station to a performance of the network determined by the second server based on information related to the network, wherein the at least two base stations comprise the first base station and at least one second base station, wherein the contribution value of the first base station is based on one or more of:
positioning information of the first base station and the second base station;
network configuration information of the first base station and the second base station;
connection status information indicating connection status between the first base station and the second base station; and
interference information indicating interference between the first base station and the second base station;
determine whether the first base station needs power reduction or power off based at least on the obtained contribution value; and
when determining that the first base station needs power reduction or power off, send an instruction for power reduction or power off to the first base station.

* * * * *